(12) United States Patent
Edelson et al.

(10) Patent No.: US 8,240,599 B2
(45) Date of Patent: Aug. 14, 2012

(54) APPARATUS FOR CONTROLLING AIRCRAFT GROUND MOVEMENT

(75) Inventors: Jonathan Sidney Edelson, Portland, OR (US); Isaiah Watas Cox, Baltimore, MD (US); Daniel Liviu Barbalata, Richmond Hill (CA)

(73) Assignee: Borealis Technical Limited (GI)

( * ) Notice: Subject to any disclaimer, the term of this patent is extended or adjusted under 35 U.S.C. 154(b) by 599 days.

(21) Appl. No.: 12/217,635

(22) Filed: Jul. 7, 2008

(65) Prior Publication Data

US 2008/0296429 A1  Dec. 4, 2008

Related U.S. Application Data

(63) Continuation-in-part of application No. PCT/US2007/019054, filed on Aug. 29, 2007.

(60) Provisional application No. 60/958,602, filed on Jul. 5, 2007.

(51) Int. Cl.
*B64C 25/50* (2006.01)

(52) U.S. Cl. ........................................................ 244/50

(58) Field of Classification Search .................... 244/50, 244/51, 75.1, 189
See application file for complete search history.

(56) References Cited

U.S. PATENT DOCUMENTS

| | | | | | |
|---|---|---|---|---|---|
| 2,920,845 | A | * | 1/1960 | Palmiter | 180/19.3 |
| 4,955,777 | A | * | 9/1990 | Ineson | 414/426 |
| 4,964,598 | A | * | 10/1990 | Berejik et al. | 244/190 |
| 5,379,663 | A | * | 1/1995 | Hara | 74/471 XY |
| 5,735,490 | A | * | 4/1998 | Berthet et al. | 244/223 |
| 5,878,981 | A | * | 3/1999 | Dewey | 244/190 |
| 7,445,178 | B2 | * | 11/2008 | McCoskey et al. | 244/50 |
| 7,793,890 | B2 | * | 9/2010 | Scherer | 244/190 |

* cited by examiner

*Primary Examiner* — Tien Dinh
*Assistant Examiner* — Keith L Dixon (57) ABSTRACT

An apparatus for controlling the movement of an aircraft having a self-propelled nosewheel, on the ground, is disclosed. The apparatus comprises a control arm; a control unit; means for transmitting information to said self-propelled nosewheel; means for receiving information at said self-propelled nosewheel; and means for controlling at least one of the speed and direction of said nosewheel; whereby airport ground staff can intuitively control the movements of said aircraft by holding said arm and moving it in the direction of required movement of said aircraft.

23 Claims, 3 Drawing Sheets

APPARATUS FOR CONTROLLING AIRCRAFT GROUND MOVEMENT

CROSS-REFERENCE TO RELATED APPLICATIONS

This application claims the benefit of U.S. Provisional Patent Application No. 60/958,602, filed Jul. 5, 2007. This application is a Continuation-in-Part of International Application PCT/US2007/019054, filed Aug. 29, 2007, and which designates the United States, which international application was published on Apr. 24, 2008, as International Publication WO08048393 in the English language. International Application No. PCT/US2007/019054 claims the benefit of GB Patent Application No. 0616984.1 filed on Aug. 29, 2006, and of U.S. Provisional Patent Application No. 60/958,602 filed on Jul. 5, 2007.

BACKGROUND OF THE INVENTION

Motors providing high torque at low speeds are known in the art. Specifically, such motors are known that are designed for the purpose of propelling aircraft on the ground.

WO05112584 to Edelson discloses a motor-generator machine comprising a slotless AC induction motor. The motor disclosed therein is an AC induction machine comprising an external electrical member attached to a supporting frame and an internal electrical member attached to a supporting core; one or both supports are slotless, and the electrical member attached thereto comprises a number of surface mounted conductor bars separated from one another by suitable insulation. An airgap features between the magnetic portions of core and frame. Electrical members perform the usual functions of rotor and stator but are not limited in position by the present invention to either role. The stator comprises at least three different electrical phases supplied with electrical power by an inverter. The rotor has a standard winding configuration, and the rotor support permits axial rotation.

WO2006002207 to Edelson discloses a motor-generator machine comprising a high phase order AC machine with short pitch winding. Disclosed therein is a high phase order alternating current rotating machine having an inverter drive that provides more than three phases of drive waveform of harmonic order H, and characterized in that the windings of the machine have a pitch of less than 180 rotational degrees. Preferably the windings are connected together in a mesh, star or delta connection. The disclosure is further directed to selection of a winding pitch that yields a different chording factor for different harmonics. The aim is to select a chording factor that is optimal for the desired harmonics.

Disclosed in WO2006/065988 to Edelson is a motor-generator machine comprising stator coils wound around the inside and outside of a stator, that is, toroidally wound. The machine may be used with a dual rotor combination, so that both the inside and outside of the stator may be active. Even order drive harmonics may be used, if the pitch factor for the windings permits them. In a preferred embodiment, each of the coils is driven by a unique, dedicated drive phase. However, if a number of coils have the same phase angle as one another, and are positioned on the stator in different poles, these may alternatively be connected together to be driven by the same drive phase. In a preferred embodiment, the coils are connected to be able to operate with 2 poles, or four poles, under H=1 where H is the harmonic order of the drive waveform. The coils may be connected together in series, parallel, or anti-parallel.

In U.S. patent application Ser. No. 11/403,402, filed Apr. 12, 2006, a motor-generator machine is disclosed comprising a polyphase electric motor which is preferably connected to drive systems via mesh connections to provide variable V/Hz ratios. The motor-generator machine disclosed therein comprises an axle; a hub rotatably mounted on said axle; an electrical induction motor comprising a rotor and a stator; and an inverter electrically connected to said stator; wherein one of said rotor or stator is attached to said hub and the other of said rotor or stator is attached to said axle. Such a machine may be located inside a vehicle drive wheel, and allows a drive motor to provide the necessary torque with reasonable system mass.

International Appl. No. PCT/US2006/12483, filed Apr. 5, 2006, discloses a motor-generator machine comprising an induction and switched reluctance motor designed to operate as a reluctance machine at low speeds and an inductance machine at high speeds. The motor drive provides more than three different phases and is capable of synthesizing different harmonics. As an example, the motor may be wound with seven different phases, and the drive may be capable of supplying fundamental, third and fifth harmonic. The stator windings are preferably connected with a mesh connection. The system is particularly suitable for a high phase order induction machine drive systems of the type disclosed in U.S. Pat. Nos. 6,657,334 and 6,831,430. The rotor, in combination with the stator, is designed with a particular structure that reacts to a magnetic field configuration generated by one drive waveform harmonic. The reaction to this harmonic by the rotor structure produces a reluctance torque that rotates the rotor. For a different harmonic drive waveform, a different magnetic field configuration is produced, for which the rotor structure defines that substantially negligible reluctance torque is produced. However, this magnetic field configuration induces substantial rotor currents in the rotor windings, and the currents produce induction based torque to rotate the rotor.

Apparatus which enables a person to use a part or the whole of his body to control video games are known in the art.

U.S. Pat. No. 4,925,189 to Braeunig discloses a body-mounted video gaming exercise device which attaches to a user's upper body via straps and buckles. The user tilts the body to simulate movement of joystick and operate the game.

NZ537761 to James-Herbert discloses an improved computer game controller comprising a chair in a harness, in which a computer game player sits to control an avatar or the like in a computer game. By moving the chair, a joystick attached to the chair is moved, and thus the avatar is controlled by the game player's bodily movements.

U.S. Pat. No. 5,139,261 to Renato discloses a foot actuated computer game controller serving as a joystick. Pressure sensor units placed on floor are actuated by stepping on with a foot to control the game.

BRIEF SUMMARY OF THE INVENTION

It would be advantageous to have a means for controlling the movements of an aircraft on the ground. It would be further advantageous for this means to be remote from said aircraft and to be operable by airport ground staff.

It is an object of the present invention to provide means for controlling at least one of the speed and direction of an aircraft, propelled by a self-propelled nosewheel, on the ground.

It is a further object of the invention to provide said means remotely from said aircraft, which means can be operated by airport ground staff.

It is a further object of the invention to provide said means which are intuitive, safe, and easy to operate.

An apparatus for controlling the movement of an aircraft having a self-propelled nosewheel, on the ground, is disclosed. The apparatus comprises a control arm; a control unit; means for transmitting information to said self-propelled nosewheel; means for receiving information at said self-propelled nosewheel; and means for controlling at least one of the speed and direction of said nosewheel; whereby airport ground staff can intuitively control the movements of said aircraft by holding said arm and moving it in the direction of required movement of said aircraft.

BRIEF DESCRIPTION OF THE SEVERAL VIEWS OF THE DRAWING

For a more complete explanation of the present invention and the technical advantages thereof, reference is now made to the following description and the accompanying drawings, in which.

DETAILED DESCRIPTION OF THE INVENTION

An apparatus for remotely controlling the movement of an aircraft having a self-propelled nosewheel, on the ground, comprises a control arm; a control unit; means for transmitting information to said self-propelled nosewheel; means for receiving information at said self-propelled nosewheel; and means for controlling at least one of the speed and direction of said nosewheel; whereby airport ground staff can intuitively control the movements of said aircraft by holding said arm and moving it in the direction of required movement of said aircraft. 'Remotely' in this context means from a location other than a drive means driving said nosewheel, and thus includes locations within or attached to said aircraft but remote from such drive means, as well as locations remote from said aircraft.

Figure 1:
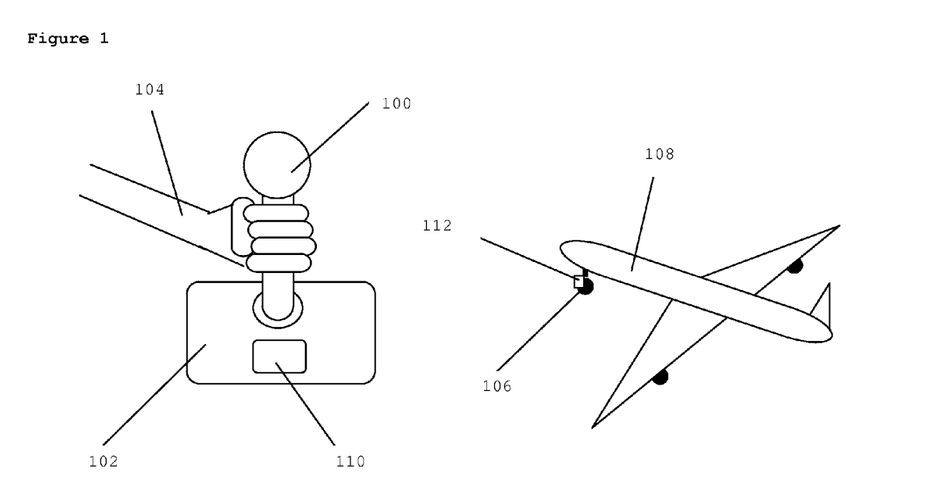
FIG. 1 shows the first embodiment of the invention, in which an aircraft is controlled by a remote, short arm.

FIG. 1 shows a first embodiment of the invention in which the control arm, control unit and means for transmitting information are remote from said aircraft and said control arm is short. Short is defined herein as shorter than a length at which a member of ground staff can walk comfortably at least one step in any direction while holding said control arm. Control arm 100 is moveably attached at its base to control unit 102, such that it can be moved by ground staff member 104. Movements of arm 100 are transmitted via transmitter 110 to receiver 112 in the self-propelled nosewheel 106 of aircraft 108, which moves according to the movements of control arm 100.

Said arm is preferably less than 0.5 m long. An advantage of this is that it can easily be manipulated while a controller stands in one location. More preferably, said arm is 0.1-0.2 m long. An advantage of this is that it can be manipulated while the heel of the operator's hand remains in one location. The arm may also be a few millimeters long and may be operated using a thumb, or may be any known form of arm or joystick suitable for this purpose.

In a first variation of the first embodiment, said arm is rigid and can preferably be pushed to cause the aircraft to decelerate and pulled to cause the aircraft to accelerate, or vice versa. The aircraft will move in a direction determined by the direction in which the arm is moved by the ground staff member holding the arm, at a speed determined by the ground staff member pushing or pulling the arm. Alternatively the speed of said aircraft may be reduced by moving said arm in a direction opposite to that of travel, which has the advantage of being similar to the way in which a pilot operates an aircraft from a cockpit. The aircraft preferably moves in the same direction as the arm, which has the advantage of being intuitive to most users when standing alongside an aircraft, or may move in the opposite direction to the arm which may be preferable for a ground controller standing opposite the aircraft.

In a second variation of the first embodiment, said arm is a flexible strap, rope, chain or any other flexible control arm made from any strong, flexible material or a rigid material in a flexible form such as a metal chain. In this variation, speed and direction are determined by the speed and direction respectively in which the airport ground staff member moves said arm. Alternatively, there may be a separate control for speed, such as a dial, lever, up and down buttons, or any other known means. The arm may only move the aircraft when it is held taut, and a safety feature may cut off communications between the arm and the aircraft when said arm becomes not taut. Alternatively, position sensors at the end of said arm may determine the movements of said arm to control the aircraft, whether said arm is taut or loose. This is discussed further in the fourth embodiment.

Said arm is preferably made from weather resistant materials appropriate for use outdoors in various weather conditions.

Said arm protrudes from said control unit and is movably attached to said control unit in a manner similar to a the stick of a joystick from its base, such that said control unit can interpret movements of said arm in order to transmit them to said aircraft nosewheel. Preferably, said control unit can recognize directional movements of said arm in at least two dimensions. An advantage of this is that the movement of the aircraft can be controlled very intuitively by a ground staff member moving the arm in the direction the aircraft is desired to be moved. Alternatively, said control unit can recognize directional movements of said arm in only one dimension. Advantages of this are that the apparatus is less expensive and easier to produce and that there is less information to transmit to said nosewheel. In this variation, left and right movements could be controlled via said arm, while forward/reverse motion of the aircraft is controlled by a separate control or by a distinct movement of said arm, for example pushing or pulling said arm.

Said control unit is preferably attached to the ground or mounted on equipment attached to the ground, near a gate at an airport. An advantage of this is that it will always be at a known location. Said control unit may also be attached to any airport gate equipment such as a passenger loading bridge or other portable gate equipment. An advantage of this is that said control unit can be moved to a gate at which it is required. Said control unit may also be attached to a maintenance hanger or other location where aircraft need to be moved, or attached to any equipment in such areas.

Said control unit may comprise a security cover for preventing unauthorized use, which covers said arm or restricts movement of said arm, whereby said arm cannot be accessed or moved without a physical key, electronic key, number code, letter code, fingerprint recognition, iris recognition, barcode recognition, or any other known means for unlocking a cover. Said arm may be retractable into said unit and said unit cover may cover only the end of the retracted arm. An advantage of this is that said arm and the junction of said arm with said unit will remain clean even in the outdoor environment in which it is used. A further advantage is that less space will be occupied by said arm when not in use. A yet further advantage is that the cover will be smaller, lighter, and easier to produce, install and use. Alternatively, said cover may cover the entirety of said arm in an unretracted state. An advantage of this is that no time is taken up in pulling out the arm from its retracted state. A further advantage is that the arm can be rigid and used in the rigid mode of use described above. As a further alternative, said cover may cover and/or restrict the movement of the junction of said arm with said control unit. An advantage of this is that the cover is smaller, lighter, and easier to produce, install and use, while maintaining all the advantages of a rigid arm, and protecting the most vulnerable part of the arm, the junction. As a yet further alternative, said cover may cover and/or restrict the movement of any part of said arm.

Said control unit may comprise a transmittal-restricting safety feature whereby movements of said arm are not transmitted to said nosewheel unless said transmittal-restricting safety feature has been disabled. Said feature may be disabled using a physical key, electronic key, number code, letter code, fingerprint recognition, iris recognition, barcode recognition or any other known means of safety feature disabling.

Said control unit may include a further drop-resisting safety feature whereby if sudden or radical movements of the arm are made, such movements are not transmitted to said aircraft. Said control unit may further include a smoothing feature whereby the movements of said arm, or the signals representing said movements, are smoothed before transmittal to said aircraft.

Directional and speed information is thus inputted by the airport ground staff member through the arm, via the control unit, to a means for transmitting information to the self-propelled nosewheel. Said means for transmitting may be any known form of transmitter, transponder, transceiver or other information communicating means. Preferably said information is transmitted wirelessly for example via infrared, optical, laser, Bluetooth, radio, radar or any other known wireless information transmittal means. An advantage of this is that no wire has to be attached, detached or stored. Alternatively said information is transmitted using electric cables, optical cables, or any other known form of wire. A wire may be detachable at one or both ends, that is, the nosewheel end and the control unit end. An advantage of this is that a reliable connection is always maintained.

Said means for receiving information at said nosewheel may be a direct conversion receiver or any known form of receiver, transponder, transceiver or other known form of information receiving means.

Said means for controlling at least one of speed and direction of said nosewheel are preferably as follows. Said self-propelled nosewheel preferably propels itself by drive means comprising a motor or motors which are most preferably mesh connected, high phase order, electric induction motors but may also be any other induction motor, switched reluctance motor, permanent magnet motor or other drive means. Specifically, said motors may be any of those described in the Background section of this patent.

In the preferable arrangement where the nosewheel self-propelling drive means is an electric motor, the braking means used to control the speed of the motors is electrical braking. This may involve changing the magnetic field applied to the motors, for example by changing the voltage, current, frequency or other parameter of the current supplied by the inverter to the motor. Furthermore, the braking means may be the application of a stationary magnetic field to the motors or the driving of said motors in a direction opposite to the direction of travel.

Aircraft are commonly fitted with two nosewheels side by side on the same axis. Preferably, each nosewheel has a motor. The steering means is preferably differential torque or thrust, wherein both motors are continually driven forwards, but to cause a left turn, the right motor is driven faster than the left, and to cause a right turn the left motor is driven faster than the right. An advantage of this is that there is less heating caused by differential torque steering than by differential braking steering. Alternatively, the steering means may be the use of differential electrical braking, thus applying the left-turn maneuver of the control arm will cause the control unit to send signals via the transmitting and receiving means to the motor of the left nosewheel to brake but not the right, effecting a left turn. The right turn maneuver will cause the control unit to send signals via the transmitting and receiving means to the right nosewheel motor to brake but not the left, effecting a right turn. Preferably, whether differential braking or differential torque is used, the control unit can detect the pressure applied to the control arm and send signals to change the speeds of the motors proportionately to the pressure applied to the control arm, thus a light pressure will effect a wide turn and a heavy pressure will effect a sharp turn. Alternatively, the control unit may not be sensitive to pressure. The forwards maneuver of the control arm may cause acceleration of both motors together to increase the speed of the aircraft. The reverse maneuver may be used to decrease the speed of the aircraft by decreasing the speed of both motors. Alternatively, or in the case where the control arm has only one dimension of movement, a separate control may be used to determine aircraft speed as described above.

In the case where the aircraft nosewheels are equipped with mechanical brakes, said means for receiving information may send signals to these mechanical brakes, which may be disc brakes, drum brakes, electromagnetic brakes, electromechanical brakes, anti-lock brakes, or any type of brake or wheel retarding means, to effect deceleration and/or differential steering.

Alternatively, and particularly but not only in the case where only one nosewheel is present, the steering means may be the aircraft's built in steering means which may be hydraulic, electrical, or any other means. The steering means may also be the mechanical turning of the strut on which the axis of the nosewheel is mounted, or the axis on which the nosewheel is mounted. Alternatively, any known means for turning a wheel or altering the speed of a wheel may be used.

Furthermore, in the case where only one nosewheel is present, there may be no built-in steering means and the nosewheel may be mounted on castors and turned manually as required. (Note: In this case, a specific variation of the invention is possible which is described here. Said nosewheel may be steered using a rigid handle physically attached to said nosewheel. Said control arm may be attached to said handle and a ground staff member may pull or (if the arm is rigid) push said handle to steer said nosewheel. In this case, only speed information will be transmitted and received in the means for transmitting and receiving information, since the steering information is being inputted directly to the nosewheel via the rigid handle. Said ground staff member may walk in front of said aircraft as in all the embodiments described herein, or (if said arm is rigid) said ground staff member may walk behind said nosewheel, either under the fuselage if there is space, or to the side of it, looking forwards and directing the aircraft from that vantage point, steering manually via the rigid handle and pushing/pulling on the rigid arm to control speed.)

The nosewheel motors may alternatively respond to signals from the means for receiving information by altering their torque, thus the aircraft is steered by application of differential torque to the nosewheel motors. The motors may alternatively respond to signals from the means for receiving information by effecting a change in motor speed and/or direction using any motor speed control techniques known in the art, including but not limited to varying voltage, vector field control, slip, current, resistance, and frequency. Furthermore, the motors may be connected such that they respond to signals from the means for receiving information to effect a turn and/or a change in speed using the aircraft's built-in nosewheel steering mechanism. These may be hydraulic, electrical, or any other built-in steering mechanism. Furthermore, the motors may be connected such that they respond to signals from the means for receiving information to effect a turn and/or a change in speed by any other workable means.

An advantage of the use of electrical braking to steer the aircraft is that mechanical brakes such as hydraulic or disc brakes are not used and heat loss due to friction as well as wear to the wheel are avoided.

The apparatus may further comprise an emergency stop feature wherein emergency stopping means are located on the control means. Said emergency stopping means is preferably a large, red, mushroom-shaped button as is commonly used for this purpose but may also be any other form of button, switch, lever, or any other known means for sending an immediate signal. Upon operating the emergency stopping means, a signal is sent via said transmitting means to said receiving means to stop the drive means and/or apply brakes. Said emergency stopping means overrides all other signals.

Figure 2:
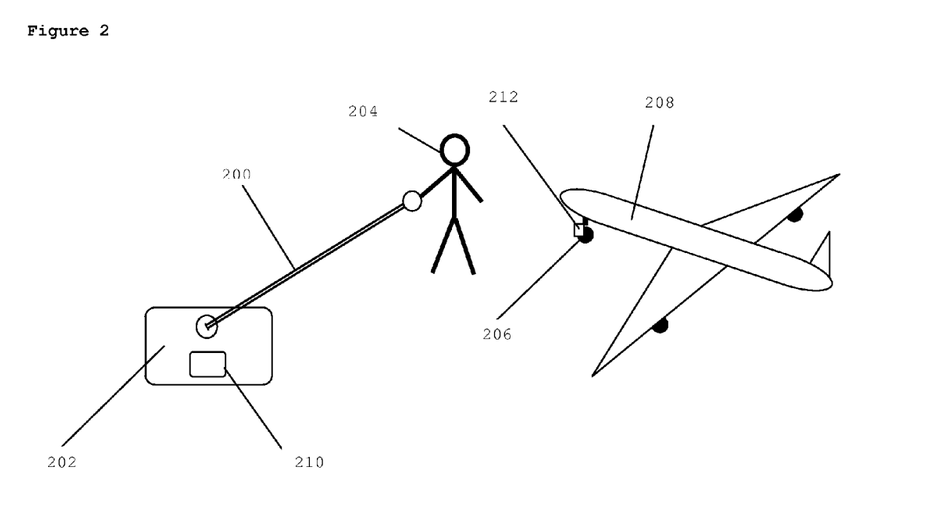
FIG. 2 shows the second embodiment of the invention, in which an aircraft is controlled by a remote, long arm.

In a second embodiment of the invention, shown in FIG. 2, the control arm, control unit and means for transmitting information are remote from said aircraft and said control arm is long. Long is defined herein as of sufficient length that a member of ground staff can walk comfortably at least one step in any direction while holding said control arm.

FIG. 2 shows the second embodiment of the invention. Long control arm 200 is moveably attached at its base to control unit 202, such that it can be moved by ground staff member 204 who walks while holding said arm. Movements of long control arm 200 are transmitted via transmitter 210 to receiver 212 in the self-propelled nosewheel 206 of aircraft 208, which moves according to the movements of control arm 200.

Said arm is preferably greater than 0.5 m in length. An advantage of this is that a ground staff member can walk comfortably at least one step in any direction while holding said control arm. This is a sensitive and intuitive way to control the aircraft. Most preferably, said arm is between 0.5 m and 2.0 m in length as this gives a reasonable distance, covered by several steps in any direction, over which the ground staff member can walk quickly and easily. A further advantage of this is that increased sensitivity is achieved: the ground staff member has a larger space in which to walk to guide the aircraft, and therefore can more sensitively guide said aircraft. A yet further advantage is that the aircraft can be led over a greater distance, which may be necessary to bring the aircraft to a desired location. An arm longer than this becomes difficult to manipulate since the ground staff member has to walk over very large distances in order to move the aircraft. However, the invention also covers lengths longer than 2.0 m. (The term walking is used to describe a normal mode of travel of an airport ground staff member and includes running, travelling in a wheelchair, walking with crutches, travelling in a vehicle or any other mode of human travel.)

Said arm may be held at or near its far end from the control unit by a member of airport ground staff. The term 'holding' also includes the possibility of said arm being attached via a harness, strap, band, or any other means of attachment to the member of airport ground staff. An advantage of physically attaching the arm to a ground staff member is that the ground staff member's hands are free and a further advantage is that safety is increased as the arm cannot be dropped which may cause unpredictable aircraft movement.

Said arm may be rigid or flexible as in the first embodiment, and all other features of said arm are as in the first embodiment.

The control unit, the means for transmitting information, the means for receiving information, and the means for controlling at least one of the speed and direction of said aircraft are as that of the first embodiment.

Figure 3:
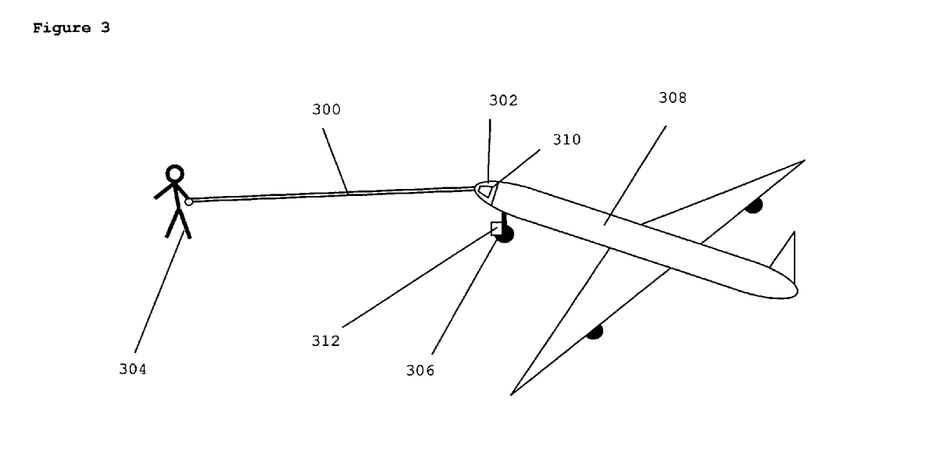
FIG. 3 shows the third embodiment of the invention, in which an aircraft is controlled by an attached, long arm.

In a third embodiment of the invention shown in FIG. 3, the control arm, control unit and means for transmitting information are attached to said aircraft and said control arm is long.

FIG. 3 shows the third embodiment of the invention. Long control arm 300 is moveably attached at its base to control unit 302, such that it can be moved by ground staff member 304 who walks while holding said arm. Movements of long control arm 300 are transmitted via transmitter 310 to receiver 312 in the self-propelled nosewheel 306 of aircraft 308, which moves according to the movements of control arm 300.

Said arm, control unit and means for transmitting information (hereafter called the 'aircraft-moving apparatus') are preferably attached to a point at the front of the aircraft from which they can be easily reached by said ground staff member, such as the lower part of the fuselage at the front of the aircraft, or a part of the nosewheel strut or other undercarriage apparatus. An advantage of this is that the aircraft can be led from the front using said arm, and the ground staff member can feel as if s/he is pulling the aircraft along as if on a leash. This is a highly intuitive means of directing an aircraft. Said ground staff member may turn to face said aircraft and walk backwards, keeping the moving aircraft in view for increased safety. Said ground staff member may also turn to face the gate or other space in which said aircraft is to be parked as and when necessary. An advantage of this embodiment is that the ground staff member cannot become confused as to the orientation of the aircraft-moving apparatus as s/he turns around, since the apparatus is attached to said aircraft. Alternatively, said aircraft-moving apparatus is attached to any point on the aircraft, such as the rear, the side, the strut of the undercarriage wheels under the wings, or any other part of said aircraft.

Said aircraft-moving apparatus may be detachable from said aircraft and may be attached to the aircraft upon its arrival at the airport, for example when the aircraft is close to a required parking space. An advantage of this is that less equipment is carried in flight, which reduces weight and fuel use, and that one set of apparatus may be used for many aircraft. Alternatively, the aircraft-moving apparatus may be fixed permanently to the aircraft, an advantage of this being that no time is taken up attaching and detaching the aircraft-moving apparatus. A further advantage is that there is no possibility of having to wait for aircraft-moving apparatus to arrive at the required gate or parking space. In certain airports or at particular gates, it may be easier to control an aircraft from behind, depending on the shape of the gate or maintenance hangar. Therefore, the aircraft-moving apparatus may be able to attach to more than one location on the aircraft, for example, it may be attachable to any undercarriage wheel strut, or to the nose of the fuselage and the tail of the fuselage. An advantage of this is that the aircraft-moving apparatus can be attached to the most appropriate location depending on the dimensions of the parking space.

In an alternative arrangement, more than one set of aircraft-moving apparatus may be attached at once, and more than one ground staff member may each operate a different control arm, with the resulting movement of said aircraft being a vector sum of the movements of each control arm. An advantage of this is that ground staff members can be positioned in more than one location and can therefore see the proximity of the aircraft to obstacles from more than one vantage point. Alternatively, control may be passed from one control arm to another at appropriate points as the aircraft is maneuvered. An advantage of this over the previous method is that only one ground staff member is moving the aircraft at any one time and the movements of the aircraft will therefore be easier to predict and visualize. Switching means such as buttons or switches may be in place on the control unit or units to transfer control from one unit to another. There may be one master unit which 'delivers' control to the appropriate unit, or any unit may be able to take and give control.

Said arm is preferably greater than 5 m in length. An advantage of this is that, if said aircraft-moving apparatus is attached to a nosewheel strut, a ground staff member can walk holding the end of said arm and maintain a position in front of the nose of said aircraft, thus it will be easier for him to judge the position of the front of the aircraft. Most preferably, said arm is between 10 m and 15 m in length. An advantage of this is that the further the ground staff member is from said aircraft, the safer s/he is. A further advantage of this is that the ground staff member has a larger space in which to walk to guide the aircraft, and therefore can more sensitively guide said aircraft. An arm longer than this will cause difficulty with parking an aircraft less than the arm's length from an obstacle such as a gate in front of the aircraft. However, the invention also covers lengths longer than 10 m. (It should be noted that, with a flexible arm, there is no such difficulty as the arm can be held at a point closer to the aircraft as the aircraft approaches a distance less than the arm's length from an obstacle. The redundant part of the flexible strap can be rolled up or folded, effectively making the arm shorter. However, airport safety standards will restrict the proximity of a ground staff member to an aircraft.)

Said arm may be held at or near its far end from the control unit by a member of airport ground staff. Alternatively, said arm may be attached via a harness, strap, band, or any other attachment to the member of airport ground staff. An advantage of physically attaching the arm to a ground staff member is that the ground staff member's hands are free and a further advantage is that safety is increased as the arm cannot be dropped which may cause unpredictable aircraft movement.

Said arm may be rigid or flexible as in the first embodiment, and all other features of said arm are as in the first embodiment.

The control unit and the means for transmitting information (with the exception of their location), the means for receiving information, and the means for controlling at least one of the speed and direction of said aircraft are as that of the first embodiment.

Figure 4A:
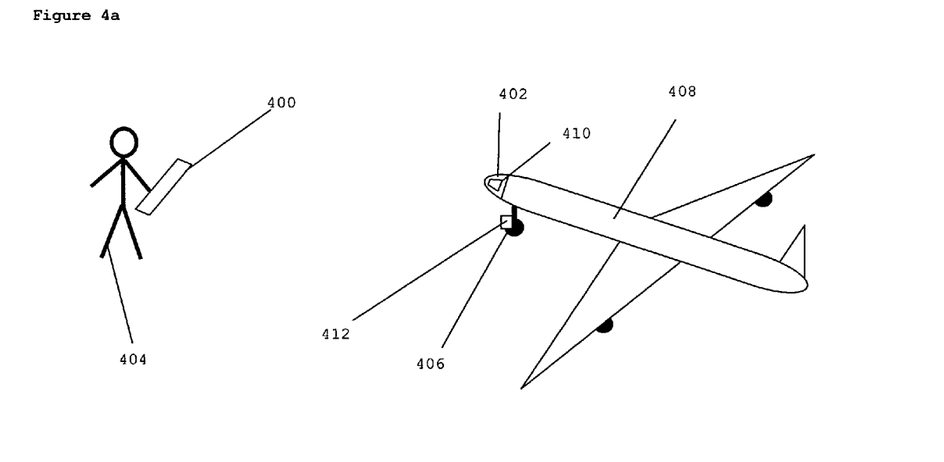
FIG. 4a shows an example of the fourth embodiment of the invention, in which an aircraft is controlled by a remote handheld device and a control unit on the aircraft.
Figure 4B:
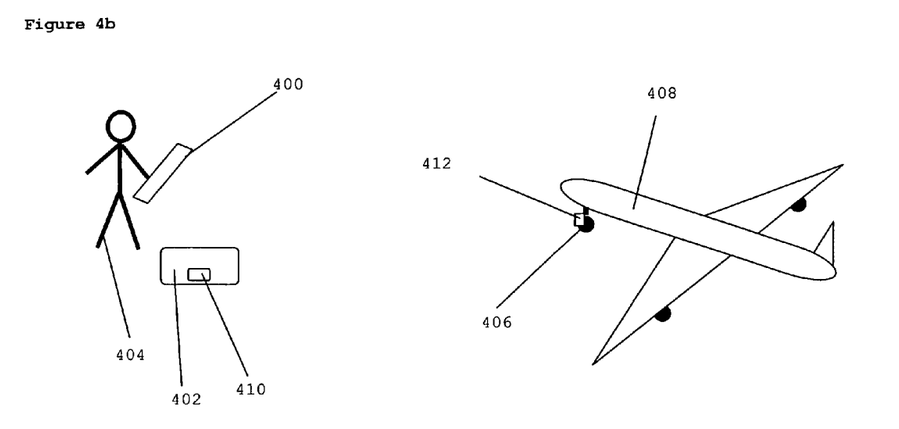
FIG. 4b shows an example of the fourth embodiment of the invention, in which an aircraft is controlled by a remote handheld device and a control unit remote from the aircraft.
Figure 4C:
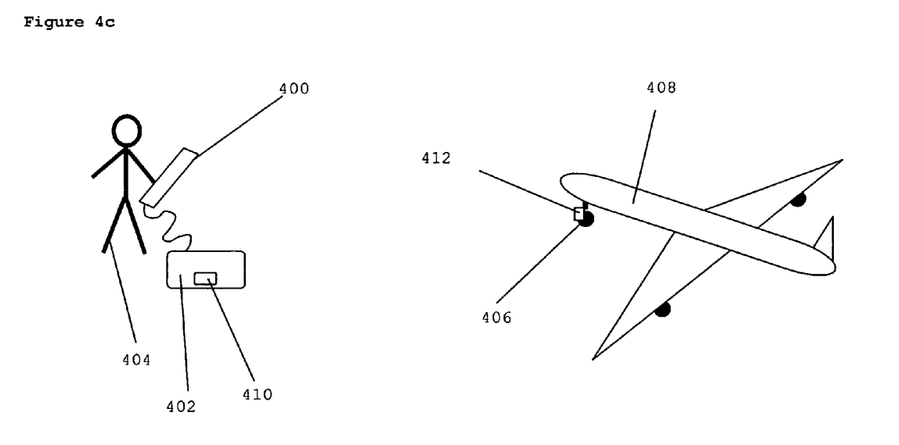
FIG. 4c shows an example of the fourth embodiment of the invention, in which an aircraft is controlled by a handheld device attached to a control unit remote from the aircraft.

In a fourth embodiment of the invention, shown in FIG. 4, the control unit and means for transmitting information may be attached to or remote from said aircraft and said control arm is remote from all other apparatus. Although the control arm may be physically attached via a flexible wire or cable to said control unit, the defining feature of the fourth embodiment is that movements of said control arm are not registered at the base of the control arm by the control unit, but rather by motion sensing equipment in said arm and/or in other equipment.

FIGS. 4*a-c* show possible arrangements of the fourth embodiment of the invention. In FIG. 4*a*, control arm 400 is remote from aircraft 408. Control unit 402 and means for transmitting information 410 are attached to aircraft 408. Movements of control arm 400 are transmitted via transmitter 410 to receiver 412 in the self-propelled nosewheel 406 of aircraft 408, which moves according to the movements of control arm 400.

In FIG. 4*b*, control arm 400 is remote from aircraft 408. Control unit 402 and means for transmitting information 410 are remote from aircraft 408. Movements of control arm 400 are transmitted via transmitter 410 to receiver 412 in the self-propelled nosewheel 406 of aircraft 408, which moves according to the movements of control arm 400.

In FIG. 4*c*, control arm 400 is remote from aircraft 408. Control unit 402 and means for transmitting information 410 are remote from aircraft 408 but attached via a flexible wire or cable to control arm 400. Said wire or cable may provide power. Movements of control arm 400 are transmitted via transmitter 410 to receiver 412 in the self-propelled nosewheel 406 of aircraft 408, which moves according to the movements of control arm 400.

These figures are by way of example only and are not intended to be limiting. Any configuration of the control arm of the fourth embodiment, a control unit, transmitting means, receiving means and nosewheel controlling means as described herein constitute this invention.

Said arm is preferably a handheld device which is ergonomically fitted to the hand and is preferably lightweight. Said device preferably has a shape which enables the ground staff member to easily orient the arm with respect to the aircraft. Said device may be shaped like a miniature aircraft and the correct orientation would therefore be the same way around as said aircraft. An advantage of this is that control of said aircraft would therefore be highly intuitive as the ground staff member simply moves the miniature aircraft in the manner in which s/he wishes the aircraft to move. A miniature ground plan, in proportion to the size of said miniature aircraft may be provided to enable the ground staff member to move the aircraft according to ground markings and obstacles. Such a ground plan may itself contain said motion sensing equipment which determines the movements of said arm for transmission to said information receiving means. The ground plan may also be a simple drawing on paper, or may be a more resilient material and may be moveable or may be permanently fixed to apparatus at the section of ground that it represents. Said arm may also be any other shape or weight, for example an oblong, a stick, an arrow, a gun, or any other shape.

Said motion sensing equipment may be one or more of a gyroscope, an accelerometer, GPS, a sensor mounted on a control unit or any other motion detecting means. Said sensor may receive infrared and ultrasound signals from said arm and determine the position of said arm by the time delay between the two signals. Said sensor may determine the position of said arm by any other means.

Said control unit may contain motion sensing equipment as described above. Said control unit differs from that of the first embodiment in that said arm does not protrude from said control unit and said control unit does not interpret movements of said arm physically. Said arm may comprise a space in which said arm can be placed for storage, and may comprise a security cover as described in the first embodiment for covering said arm in place on said security cover. Alternatively, a security cover may cover only said control arm, separate from said control unit. All other features of said control unit are as described in the first embodiment.

The means for transmitting information, means for receiving information and means for controlling the speed and/or direction of said nosewheel are all as described in the previous embodiments.

In a fifth embodiment of the invention, a method of remotely controlling the movement of an aircraft having a self-propelled nosewheel, on the ground, is disclosed. The method comprises the steps of: accessing and turning on a control unit, holding a control arm, moving the control arm in the direction in which and/or at the speed at which the aircraft is desired to be moved.

Said control unit, control arm and aircraft are as described in any of the previous embodiments.

The invention claimed is:

1. An aircraft ground movement control system with apparatus to enable airport ground staff from a location remote from the aircraft to control either or both of aircraft ground speed and direction of ground movement of an aircraft driven on the ground by at least one self-propelled nose wheel, comprising
    a. an aircraft equipped with a self-propelled nose wheel, wherein said nose wheel propels itself by drive means comprising an electric motor to move the aircraft on the ground;
    b. an aircraft ground movement control unit located remotely from the aircraft self-propelled nose wheel,
    c. an aircraft ground movement control arm movably attached by one end to said remotely located control unit, wherein an opposite end is movable by airport ground staff to operatively communicate directional movements to said control unit to input aircraft ground speed and direction information to said control unit;
    d. information transmission means on said remotely located control unit for transmitting the inputted aircraft ground speed and direction information to said self-propelled nose wheel;
    e. information receiver means at said self-propelled nose wheel for receiving the ground speed and direction information transmitted by said information transmission means; and
    f. speed and direction control means in operative communication with the self-propelled nose wheel drive means and responsive to signals from said information receiver means to control either or both of the ground speed and direction of ground movement of the nose wheel to move the aircraft on the ground at a desired speed or in a desired direction in response to the received ground speed and direction information corresponding to the movements of the control arm.

2. The aircraft ground movement control system described in claim 1, wherein said information transmission means is one selected from the list comprising transmitters, transponders, and transceivers.

3. The aircraft ground movement control system described in claim 1, wherein said information transmission means is wireless.

4. The aircraft ground movement control system described in claim 3, wherein said information transmission means is a wireless transmission means selected from the group comprising infrared, ultrasound, optical, laser, Bluetooth, and radar wireless transmission means.

5. The aircraft ground movement control system described in claim 1, wherein said information transmission means on said remotely located control unit is a wire attached between said control unit and said information receiving means on said nose wheel selected from the group comprising electrical wire and optical wire.

6. The aircraft ground movement control system described in claim 1, wherein said information receiver means is one selected from the group comprising receivers, transponders, and transceivers.

7. A method for controlling by airport ground staff the ground speed and direction of ground movement of an aircraft equipped with at least one self-propelled nose wheel to move the aircraft at a desired speed and in a desired direction on the ground, comprising:
    a. providing an aircraft equipped with at least one self-propelled nose wheel, wherein said at least one nose wheel propels itself by drive means comprising at least one electric motor to move the aircraft on the ground, at least one control unit located remotely from the aircraft, and at least one control arm movably and operatively attached at one end to said remotely located control unit so that said at least one control unit recognizes directional control movements of said at least one control arm;
    b. providing ground speed and direction information transmission means on said at least one control unit, ground speed and direction information receiver means on said at least one self-propelled nose wheel, and speed and direction control means in operative communication with said at least one electric motor and responsive to signals from said information receiver means;
    c. providing airport ground staff access to the at least one remotely located control unit, wherein an airport ground staff operator activates said control unit;
    d. inputting information to said at least one control unit by the ground staff operator moving an end of the at least one control arm not attached to said control unit in at least one of a speed and direction corresponding to a desired speed and direction of ground movement of the aircraft, wherein the movement of the at least one control arm is recognized by said at least one control unit; and
    e. transmitting the inputted speed and direction information from the information transmission means on the control unit to the information receiver means on the nose wheel, wherein signals are transmitted from the information receiver means to the speed and direction control means to said at least one electric motor, thereby controlling the at least one motor to drive the at least one self-propelled nose wheel and move the aircraft on the ground at a desired speed and in a desired direction corresponding to the movement of the at least one control arm.

8. The method for controlling ground movement of an aircraft described in claim 7, wherein the aircraft moves in a direction opposite to the direction in which said aircraft ground movement control arm is moved.

9. The aircraft ground movement control system described in claim 1, wherein said ground movement control unit is attached to a ground location remote from the aircraft where aircraft need to be moved selected from the group of locations consisting of the ground, equipment attached to the ground, an airport gate, passenger loading equipment, and a maintenance hangar.

10. The aircraft ground movement control system described in claim 1, wherein said aircraft ground movement control arm has a length selected from the lengths comprising less than 0.5 meters, in the range of 0.5 to 2.0 meters, and greater than 2.0 meters.

11. The aircraft ground movement control system described in claim 1, wherein an end of said aircraft ground movement control arm not attached to said remotely located control unit is attached to a location at the front of the aircraft other than on or adjacent to a nose wheel.

12. The aircraft ground movement control system described in claim 10, wherein said aircraft ground movement control arm is formed from a material selected from the group of materials including rigid materials, flexible materials, and rigid materials in flexible form.

13. The aircraft ground movement control system described in claim 9, wherein said ground movement control unit includes a security cover configured to restrict unauthorized access to said remotely located control unit at said ground location and to cover at least part of said ground movement control arm and restrict movement of said ground movement control arm.

14. The aircraft ground movement control system described in claim 1, wherein said ground movement control unit is located on said aircraft in a location remote from said nose wheel, and said aircraft ground movement control arm comprises a hand held device remote from and attached to said ground movement control unit by a wireless connection.

15. The aircraft ground movement control system described in claim 1, wherein said ground movement control unit is located remotely from said aircraft and said aircraft ground movement control arm comprises a hand held device remote from and attached to said ground movement control unit by a wireless connection or by a flexible wire or cable.

16. The aircraft ground movement control system described in claim 15, wherein said hand held device has an aircraft-shaped configuration shaped to correspond to the configuration of said aircraft, thereby enabling airport ground staff to intuitively control the movements of said aircraft by moving said hand held device in a desired direction of ground travel or speed.

17. The aircraft ground movement control system described in claim 1, further comprising transmittal-restricting safety means for blocking the transmission of inputted information from said information transmission means on said control unit to said information receiver means on said nose wheel, whereby ground staff movements of said ground movement control arm are not transmitted to said nose wheel.

18. The aircraft ground movement control system described in claim 1, further comprising emergency stop means located on said ground movement control unit and activatable to send a signal from said information transmission means on said control unit to said information receiver means on said nose wheel to stop movement of said nose wheel.

19. The method for controlling the ground movement of an aircraft described in claim 7, wherein the speed of said aircraft can be reduced by moving said aircraft ground movement control arm in a direction opposite to that of the aircraft's direction of travel.

20. The method for remotely controlling the ground movement of an aircraft described in claim 7, further including the step of moving the control arm at a speed at which it is desired to move the aircraft.

21. The method for remotely controlling the ground movement of an aircraft described in claim 7, wherein more than one control unit and more than one control arm are used by more than one airport ground staff operator positioned in more than one location remote from an aircraft to control the ground movement of the aircraft, and said control units and said control arms are in operative communication with each other and with the information receiver means on at least one aircraft nose wheel, wherein the resulting movement of the aircraft is a vector sum of the movements of each control arm.

22. The method for remotely controlling the ground movement of an aircraft described in claim 20, wherein said at least one control unit is activated to control the speed of said motor by electric braking.

23. The method for remotely controlling the ground movement of an aircraft described in claim 7, wherein said aircraft has two nose wheels, each driven by an electric motor, and said at least one control unit is selectively activated to activate said motors to steer the aircraft by differential torque steering or differential braking steering.

* * * * *